United States Patent [19]
Scott

[11] Patent Number: 5,036,211
[45] Date of Patent: Jul. 30, 1991

[54] INFRARED SIGNATURE CONTROL MECHANISM

[75] Inventor: Owen S. Scott, Salisbury, Australia

[73] Assignee: The Commonwealth of Australia, Canberra, Australia

[21] Appl. No.: 477,940

[22] PCT Filed: Dec. 23, 1988

[86] PCT No.: PCT/AU88/00487
§ 371 Date: Jun. 21, 1990
§ 102(e) Date: Jun. 21, 1990

[87] PCT Pub. No.: WO89/06338
PCT Pub. Date: Jul. 13, 1989

[30] Foreign Application Priority Data

Dec. 23, 1988 [AU] Australia ..................... PI6149

[51] Int. Cl.[5] ..................... G01J 1/00
[52] U.S. Cl. ..................... 250/495.1; 250/493.1; 250/494.1; 428/919
[58] Field of Search ..................... 250/495.1, 494.1, 493.1, 250/504 R, 351; 428/919, 163, 167; 244/1 R, 158 R; 350/1.1

[56] References Cited

U.S. PATENT DOCUMENTS

| | | | |
|---|---|---|---|
| 3,967,026 | 6/1976 | Dalblom | 428/919 |
| 4,289,677 | 9/1981 | Supcoe et al. | 428/919 |
| 4,611,524 | 9/1986 | Ferris | 89/36.01 |
| 4,634,293 | 1/1987 | D'Agostino et al. | 250/493.1 |
| 4,743,904 | 5/1988 | Morton et al. | 342/14 |

*Primary Examiner*—Jack I. Berman
*Assistant Examiner*—Kiet T. Nguyen
*Attorney, Agent, or Firm*—Edward W. Callan

[57] ABSTRACT

A means of reflecting and emitting electromagnetic energy in an appropriate wavelength band comprising an arrangement (10) of surfaces (11) which are reflective to energy in that wavelength band and energy emitters (12) having an emission of energy of such intensity that the combined reflection and emission of said surfaces match energy of a background in that wavelength band thereby camouflaging the surfaces. The said emitters (12) comprise strips of material which, upon energizing with an electric current, become heated and radiate energy. The means further comprises at least one radiometer (17) in association with a comparison means to provide an electrical signal which is a function of the difference between the combined reflection and emission and of the background, the electrical signal controlling the energization of the energy emitters (12).

11 Claims, 1 Drawing Sheet

INFRARED SIGNATURE CONTROL MECHANISM

Figure 1A:

This invention relates to means and method for reflecting and emitting electro-magnetic energy and although not directly restricted to infrared energy, the invention is particularly suitable for reflectance and emittance for such energy to a degree which will provide a composite energy emission which corresponds to the surrounding environment so that the device can be used for camouflage purposes and thereby reduce the danger of detection by surveillance systems or the danger of a tracking device of a missile detecting its target against the background.

BACKGROUND OF THE INVENTION

Surveillance systems and missiles frequently make use of infrared detectors capable of comparing temperature differentials between objects and their backgrounds by comparing their emitted infrared energy, in some cases where the differential is as low as 0.1° K. Missile detectors usually rely largely on the existence of a radiation contrast between the target and the background area, the net radiation from each being caused by both reflection and emission from their surfaces. The detectors are often operable in the wavelength ranges of from 3 to 5 and 8 to 14 micrometers. The wavelength band with which this invention is concerned extends throughout the infrared range and can also be applied to the ultraviolet, visible and millimeter wavebands.

It is known that reflectors have been made to reflect for example the energy from the local environment in the case of an object to be camouflaged so that the detector will fail to "recognise a target", but that system has limitations and is only partially effective, due to difficulty in selecting a region of the local environment to be reflected which has the same radiance as the background to be matched.

It is therefore an object of this invention to provide means which will minimise the differential of the combination of radiation and reflectance between a potential target and its background thereby constituting a "camouflage".

BRIEF SUMMARY OF THE INVENTION

In this invention there is provided on an object to be camouflaged an arrangement of surfaces which comprise reflecting surfaces and energy radiating surfaces, and by measuring the background emission and object emission, control of the energy radiating surfaces can effect a match between the two.

The energy which is received from the sky at high elevation angles, particularly at night is equivalent to that from a black body source at a low temperature, often in the range of 240° K. to 250° K. The energy emanating from a sea surface (for example) is equivalent to that of a black body in the range of 270° K. to 300° K. A background at sea therefore is likely to have a wavelength emission approximating that of a black body of temperature between 260° K. and 290° K. depending on aspect which effects the sea surface emissivity and reflectivity.

Energy from a grey-body source having a temperature of T° K. and emissivity of $\epsilon$ is a function of the temperature and emissivity according to the formula $\sigma\epsilon T^4$, where $\sigma$ is Stefan's constant.

Energy reflected from a surface of emissivity $\epsilon$ is a function of the black body source of Temperature $T_1$ which is reflected according to the formula $\sigma(1-\epsilon)T_1^4$. If the source being reflected is a grey-body of emissivity $\epsilon_1$ this formula becomes $\sigma(1-\epsilon)\epsilon_1 T_1^4$.

The wavelength at which the maximum emission occurs is also a function of source temperature. For a comprehensive understanding of radiated and reflected energy, reference may be made to chapter 1 of the publication RADIATION THEORY by W. L. Wolfe and George J. Zissis, published by the Office of Naval Research, Department of the Navy, Washington, D. C., U.S.A.

The energy difference normally detected by an infrared seeker system at maximum range is usually that equivalent to a black body temperature difference in the range of 1° K. to 5° K. Detectors do not discriminate different wavelengths in the individual wavebands with which this invention is concerned.

Therefore by controlling the temperature of the heated areas of a combined reflection/radiation arrangement, the net radiated energy can be made to match that a background environment in the waveband required.

More specifically, the invention consists of an arrangement of surfaces which are reflective to energy in a wavelength band and energy emitters having an emission of energy of such intensity that their combined reflection and emission match energy of a background in that wavelength band.

Figure 1B:
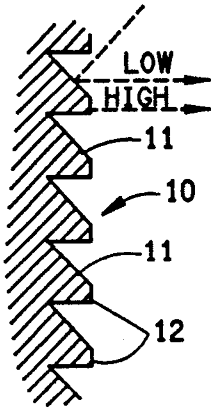
Figure 1C:
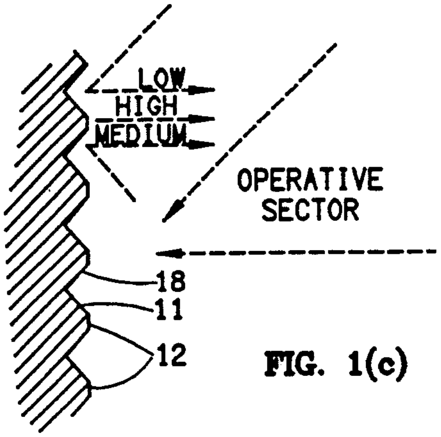

An embodiment of the invention is described hereunder in some detail with reference to, and is illustrated in, the accompanying drawings, in which:

FIG. 1 is a diagrammatic representation showing:

FIG. 1(*a*) an arrangement of reflecting surfaces,

FIG. 1(*b*) the surfaces of (a) drawn to a larger scale, and

FIG. 1(*c*) an alternative reflecting surface arrangement; and

Figure 2:
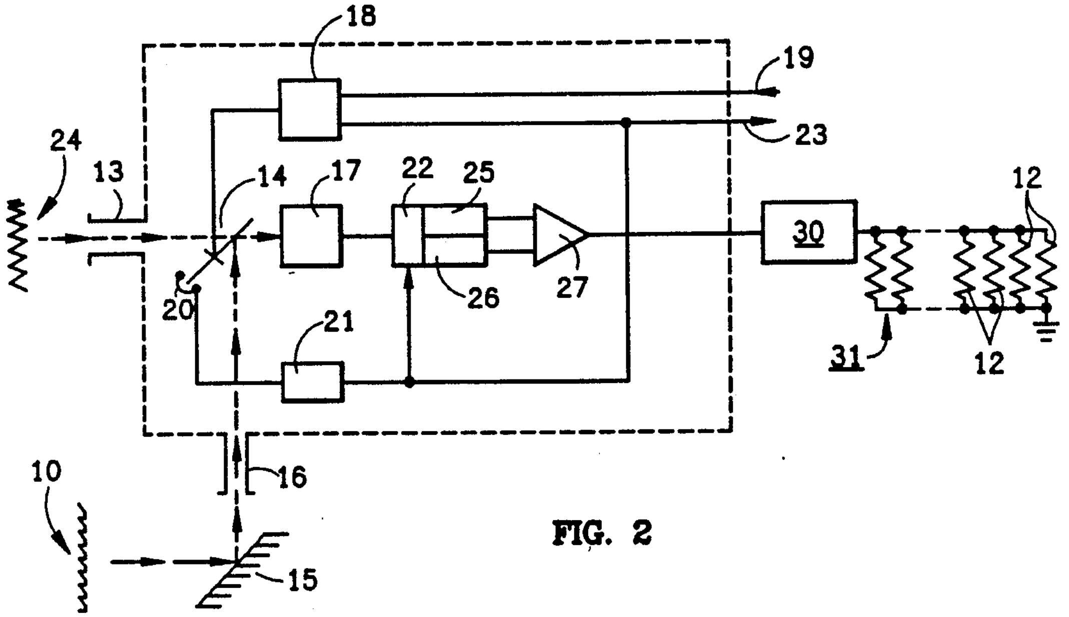

FIG. 2 is a simplified block diagram of an electrical circuit.

In this embodiment a reflecting surface arrangement 10 (FIGS. 1(*a*) and 1(*b*)) comprises a plurality of reflecting strips 11 of low emissivity and between these are located a plurality of hot metal radiating strips 12 of high emissivity. The reflecting strips 11 reflect the radiation from the sky normally equivalent to radiation from a surface of temperature usually between 253° K. and 240° K. while the radiating strips 12 can be heated to produce a temperature higher than the ambient temperature, usually between 0° and about 325° K.

By means described below the combined energy emissions from the reflecting surfaces and the radiating surfaces can be controlled by comparator means to match the background emissions.

Background emissions 24 are directed to a radiometer via an aperture 13 and an aperture within a chopper disc 14. Emissions from the object 10 after reflection from a mirror surface 15 and via aperture 16 are reflected off the chopper surface. Thus as the chopper disc 14 rotates, the background and object emissions are directed to the radiometer 17 alternately.

The rotation of the chopper disc 14 is controlled by a motor (not shown) which is controlled by circuit 18 and input 19. The rotation of the chopper disc 14 is also detected by sensor means 20. The sensor means signal output is processed by conditioning circuit 21 to provide a trigger control to a switching circuit 22. This processed signal output is also used by the chopper motor control circuit 18. Output 23 can be used to monitor the conditioning circuit 21 output.

The source switching circuit 22 directs the output of the radiometer 17 to the background pulse integrator 25 when the chopper aperture allows background emissions 24 through and directs the output of the radiometer 17 to the object pulse integrator 26 when radiation from the object 10 (reflecting/emitting surface) is reflected from the chopper into the radiometer.

The pulse integrators 25 and 26 output a voltage level representative of the received emissions from the two sources. They feed into a differential amplifier 27 which is biased to output a voltage level which varies in response to the difference between the received emissions. These processes of detection, amplification, integration and comparison could equally be performed by microprocessor means.

the output of the differential amplifier 27 is fed via wire means to a radiating strip/s driving circuit 30.

This driving circuit controls the current flow through the current loop 31 and through the radiating strip elements 12, varying the flow until the combined energy reflected and emitted from the arrangement 10, on the object is the same as that from background 24.

Known infrared detectors have limited spatial discrimination capabilities and the present maximum resolution allows differences of source temperature to be detected at 100 cms apart when viewed from 10 kms away. Therefore it is advantageous in application that the geometry of the arrangement allows for surfaces to be sized with less than 100 cms effective separation, while maintaining an optimum reflective surface angle and radiating strip width, but obviously the closer the better, so that the thickness of the combined surface is minimised. The minimum spacing is defined by manufacturing requirements and ultimately by the wavelength of the radiation involved and the discrimination sensitivity of infrared detectors.

If the arrangement of FIG. 1(*c*) is used, the secondary reflecting strips 18 reflect the energy from the environment below the object. If the environment below the object has similar radiance to the background, the heater power required is reduced.

The physical embodiment of the invention uses known reflecting surfaces and known energy transmission surfaces. For example the reflecting surfaces can comprise tiles or sheets and the radiating strips can be replaced by appropriate "pin points" for example incandescent filaments, light emitting diodes or the like. However in the preferred embodiment herein described the reflecting strips are conveniently of aluminium or gold suitably coated with a transparent coating, and of the transparent coatings previously known, by far the most useful is hard carbon or diamond-like coating which is applied to the surfaces in known manner by means of an ion beam generator which directs a beam of energy on to the surface when the surface is contained within a housing at low pressure and the housing in turn contains a hydrocarbon gas such as methane or acetylene in the presence of hydrogen, this however being a known technique. The coating can be made "selective" that is its optical properties can be made to depend on the transmitted wavelength. A hard carbon or diamond-like coating can contain graphite or other particles of such size and concentration that it has a low reflectivity in the visible part of the spectrum but is transparent in the relevant wavelengths generally above 3 micrometers. The films are very hard and able to withstand the rigors of cleaning and general use. The carbon is refractory, and can alternatively be applied by alternative techniques, including sputtering, evaporation and reactive decomposition.

The radiating strips of metal also coated by hard carbon are first blackened to increase emissivity thus reducing power requirements for radiation.

The claims defining the invention are as follows:

1. A means for reflecting and emitting electro-magnetic energy in an appropriate wavelength band comprising an arrangement of surfaces which are reflective to energy in that wavelength band and energy emitters having an emission of energy of such intensity that the combined reflection and emission of said surfaces match energy of a background in that wavelength band.

2. A means according to claim 1 wherein said reflective surfaces comprise a plurality of surfaces of relatively low emissivity and said energy emitters comprise a plurality of surfaces of relatively high emissivity.

3. A means according to claim 2 wherein said reflective surfaces comprise some surfaces which are so oriented as to reflect energy from above the horizon.

4. A means according to claim 2 wherein said reflective surfaces comprise some surfaces which are so oriented as to reflect energy from below the horizon.

5. A means according to claim 2 wherein said emitters comprise strips of material which, upon energising with an electric current, become heated and radiated energy.

6. A means according to claim 1 further comprising at least one radiometer, comparison means associated with the radiometer and operative to provide an electrical signal which is a function of the difference between the combined reflection and emission, and of the background, and further comprising a driving circuit controlled by the electrical signal and coupled to the emitters to complete a feedback circuit which varies the energy supplied to the emitters to match the background electro-magnetic energy in the appropriate wavelength band.

7. A means according to claim 6 wherein there is only one radiometer, and a chopper intercepts the background electro-magnetic energy and the combined reflected and emitter energy of said surfaces.

8. A means according to claim 6 wherein there is only one radiometer, a chopper rotational about an axis inclined to radiometer, a motor coupled for drive to the chopper, the chopper having an aperture, and a rear reflective surface, further comprising a mirror arranged to reflect said combined reflection and emission to the rear reflective surface of the chopper when the radiometer is directed towards said background, the dimensions of the aperture and rear reflective surface being such that, upon chopper rotation, equal periods of energy of combined reflection and emission, and of energy of background, are sequentially imparted to the radiometer.

9. A means according to claim 1 further comprising hard carbon coatings on said surfaces.

10. A means according to claim 1 further comprising diamond-like coatings on said surfaces.

11. A means according to claim 1 wherein adjacent said low emissivity surfaces are spaced apart by distances not exceeding 100 cm, and adjacent said reflective surfaces are spaced apart by distances not exceeding 100 cm.

* * * * *